Figure 1:
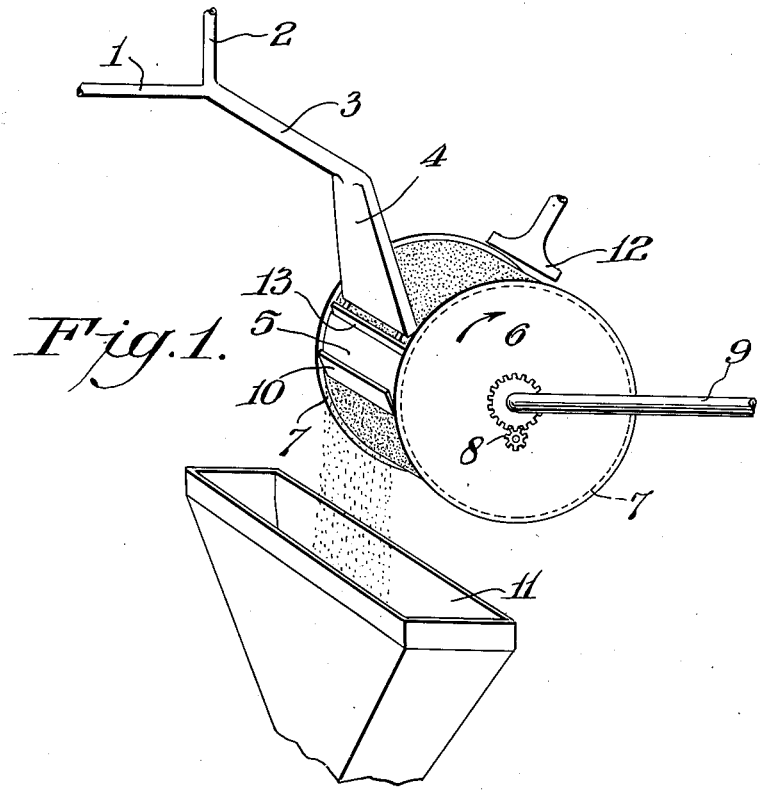

April 15, 1952  R. D. KRALOVEC ET AL  2,592,809
PREPARATION OF NITROGENOUS FERTILIZER COMPOSITIONS
Filed Jan. 27, 1949

INVENTORS
ROBERT D. KRALOVEC and
ROBERT L. HUFFMAN
BY James B. Cavanagh
AGENT

Patented Apr. 15, 1952

2,592,809

UNITED STATES PATENT OFFICE 2,592,809

PREPARATION OF NITROGENOUS FERTILIZER COMPOSITIONS

Robert D. Kralovec and Robert L. Huffman, Wilmington, Del., assignors to E. I. du Pont de Nemours & Company, Wilmington, Del., a corporation of Delaware Application January 27, 1949, Serial No. 73,052

19 Claims. (Cl. 260—69)

This invention relates to the preparation of gradually-available nitrogenous fertilizer compositions, and more particularly it relates to a new and useful process for preparing such compositions from urea and formaldehyde.

It has been known heretofore that fertilizer compositions may be prepared by reacting urea with formaldehyde under certain specified conditions. For example, Rohner and Wood in U. S. Patent 2,415,705 describe the reaction of 0.75 to 1.25 mols formaldehyde and 1 mol urea at a pH of 3 to 5 and at temperatures within the range 40° to 75° C. to give a resin having fertilizer properties.

Urea-formaldehyde fertilizers of this general nature are potentially very attractive for three reasons. They are non-hygroscopic; they contain large amounts of nitrogen in a form which is water-insoluble and hence not easily leached from the soil; and this nitrogen is available as plant food, but instead of all being available in the soil at a particular time, it becomes available gradually throughout the growing season. The need for such fertilizer materials is great because the natural organic materials such as blood meal and tankage which have been used for this purpose in the past are in short supply and command high prices.

It is an object of this invention to provide an improved process for preparing urea-formaldehyde fertilizer compositions. It is another object of this invention to provide such a process which is rapid, continuous, economical, and well adapted for commercial use. A further object is to provide a process for preparing urea-formaldehyde fertilizer compositions of consistently high quality as regards the insolubility and availability of their nitrogen contents. Other objects of the invention will appear hereinatfer.

According to this invention, it has been found that superior solid urea-formaldehyde fertilizer compositions may be obtained by continuously introducing a liquid aqueous composition containing from 1.3 to 1.6 molecular equivalents of urea per molecular equivalent of formaldehyde onto a moving surface in an amount sufficient to form a thin layer on said surface of from $\frac{1}{32}$ inch to $\frac{1}{4}$ inch in thickness, subjecting the urea-formaldehyde composition to reaction thereon at a temperature of from 60° to 120° C. and at a pH of from 2 to 6 until solidification of the composition occurs, and thereafter continuously removing the solidified product from said surface.

According to a preferred embodiment of this invention, the moving surface comprises the outer curved surface of a drum or cylinder which rotates on its axis and which may be provided on its inner side with a heat transfer medium such as steam.

A clearer understanding of certain features of the invention may be had by reference to the figures in the drawing, which, however, are to be viewed merely as aids in explaining the process, and not in any sense as limitations thereof.

Referring to Figure 1, a suitable urea-formaldehyde liquid composition is introduced at 1 and is continuously mixed with acid catalyst introduced at 2. This acidified composition passes through a short mixing section 3 and is then distributed by a spreader device 4 onto the outer curved surface 5 of the drum-reactor 6. For ease of cleaning in the event of polymer build-up, it is preferable to have the short mixing section 3 constructed in the form of an open trough. The drum-reactor may, if desired, be provided with rims 7 which serve to prevent any run-off of the liquid. The drum reactor rotates slowly on its axis in the direction indicated by the arrow, and may be driven by any suitable mechanism including, for instance, the gear arrangement suggested at 8. The temperature on the drum surface is controlled by means of steam of the desired pressure introduced into the drum from pipe 9 and exhausted at the other end of the drum through a pipe not shown. As the liquid composition contacts the drum, it forms into a thin film whose thickness is dependent upon the relative rates of feed introduction and rotation of the drum-reactor. As the film moves away from its point of introduction, it rapidly begins to thicken and solidify under the influence of the acid catalyst and the high temperature. After a given portion of the film has completed nearly a full rotation on the drum, the reaction is finished. The solidified product is removed, as by means of the doctor knife 10, and drops into a container or hopper 11. Thereafter the product is preferably cooled, the acid catalyst is neutralized, and the product is dried to provide a fertilizer which will retain its desirable characteristics over a long period. The use of a rubber dam 13 may be advantageous in forming a small pool of the liquid composition and preventing its running down the wrong side of the drum. If a dam is used, fresh feed should be added to the edge of the dam to displace the reacting pool of liquid in the direction of travel of the drum and thereby minimize build-up of polymer on the dam.

The process may be modified, if desired, by contacting the solidified product while still on the drum with a neutralizing agent. When so operating, the drum is generally rotated at a relatively slower speed so that the reaction is finished after a smaller arc has been traversed. At this point, a neutralizing agent is either spread as a solid or sprayed as a liquid over the product by a movable mechanism such as that shown at 12. The neutralized product then remains on the drum and a considerable portion of its water content is evaporated away before it reaches the doctor knife 10.

Figure 2:
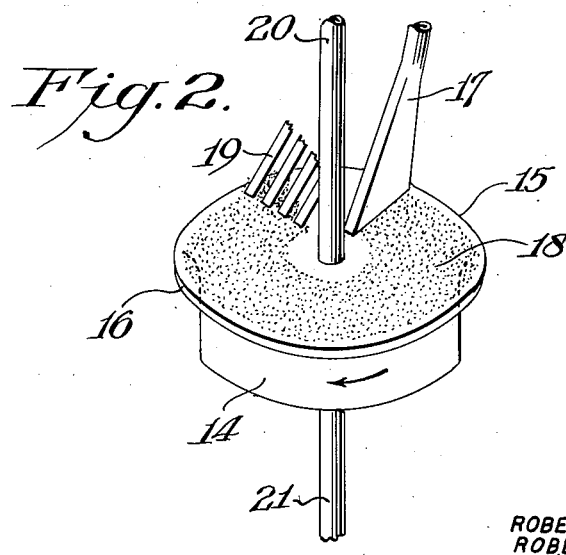

Another embodiment of the invention is depicted in Figure 2 wherein the drum 14 is in effect turned so that one end 15 is uppermost, and that end is preferably flanged outwardly as shown at 16. As in the process of Figure 1, the acidified liquid composition is continuously fed through a spreading device 17 and onto the surface of the rotating drum 14 in the form of a thin film 18. After the reaction is complete, the solidified product is removed by one or a number of doctor knives 19. The temperature is controlled by means of steam introduced into the hollow inside of drum 14 through pipe 20 and removed through pipe 21. If it is desired to neutralize the reaction product, this may be done either after removal of the product from the drum surface or while it is still on the drum. In the latter instance, the neutralized product may conveniently be allowed to remain on the drum in order that it may be dried by evaporation of a portion of its water content.

Careful control of all the reaction variables is essential in order to take advantage of the rapid reaction rate of this novel process and at the same time obtain a high quality fertilizer. Prior processes have involved very much longer reaction times because the present combination of conditions was not known, nor was any method known for controlling the reaction and keeping it within these conditions.

Evaluation of these urea-formaldehyde fertilizer compositions is based mainly on two properties, their insolubility and their availability for plant nutrition. The insolubility is expressed as that percentage of the total nitrogen content which is water-insoluble. It is determined according to the Official and Tentative Methods of Analysis of the Association of Official Agricultural Chemists, 6th ed., 1945, procedure 2.35. The availability may be expressed as the percentage of the insoluble nitrogen which nitrifies during a certain period in the soil and is dependent to a certain extent upon the type of soil in which the test is made. A reasonably accurate estimate of the availability may be obtained by determining the percentage of the insoluble nitrogen which dissolves when a sample of 0.25 g. of the product is heated to 100° C. for 30 minutes in 250 ml. of neutralized water. The percentage-figure thus obtained is called the "availability index," and is approximately equal to the amount of insoluble nitrogen which nitrifies during the first six months in the soil. For most uses, urea-formaldehyde fertilizer compositions should contain at least about 60% of their nitrogen in an insoluble form, and at least about 50% of this insoluble nitrogen should be available for plant nutrition within six months in the soil, i. e. the availability index should be at least about 50%. For certain uses, however, compositions characterized by an availability index between 40 and 50% have proved very advantageous.

The mol ratio of urea to formaldehyde in the feed is one of the most important variables affecting product quality. If the remaining process variables are held constant within the preferred ranges, the availability index of the product is too low when mol ratios lower than about 1.3:1 are employed and the insolubility of the product becomes too low when mol ratios higher than about 1.6:1 are employed. It is believed that the desired product may be represented by the formula:

$$NH_2.CO.NH.CH_2[NH.CO.NH.CH_2]_x.NH.CO.NH_2$$

where $x=1$ to 4, and, under the rapid reaction conditions of this invention, the greatest amounts of these compounds are formed when the stipulated mol ratios of reactants are employed. The use of the higher mol ratios is advisable since the cost of the product is thereby decreased and its nitrogen content is increased.

In preparing the liquid feed composition for the process of this invention, it is possible to mix the formaldehyde with a urea solution immediately before adjusting the pH and introducing the composition onto the moving surface. It is also possible to obtain a relatively stable, premixed feed by the following means: (1) neutralizing the formaldehyde to a pH between 9.0 and 9.5 before mixing it with the urea; and, (2) heating the mixture of neutralized formaldehyde solution and urea to about 60° C. for 20 minutes and then cooling to about 25° C., or heating to about 40° C. until the urea is dissolved and then keeping it at about 35° C. If it is desired to speed up the reaction on the moving drum, the pre-mixed feed may advantageously be heated to about 60° or 70° C. prior to addition of the acid catalyst. A small amount of resinification in the feed may be desirable, but feed which has become more resinified should be used promptly.

Either crude or crystal urea may be employed as the raw material in the process. The formaldehyde may be provided in the form of the usual 37% aqueous solution, or in the form of a concentrated aqueous solution of about 60% formaldehyde content, or in the form of a solution of higher methylol ureas derived, for instance, by reacting 4 to 6 mols of hot, concentrated formaldehyde with 1 mol of urea at a pH of 7.0 to 9.0 according to the method disclosed by H. M. Kvalnes in U. S. patent application Ser. No. 732,927, now U. S. Patent 2,467,212. The advantage of employing these latter forms of formaldehyde is that they make possible the preparation of more concentrated feeds which in turn speed up the ultimate reaction and minimize subsequent product drying requirements. The higher methylol ureas are particularly useful in that they eliminate practically all loss of formaldehyde during the process. Feeds containing from 60% to 85% solids content, i. e. from 40% to 15% water, are preferred, although good results can be obtained outside this range. The presence of methanol in the formaldehyde is not objectionable. Film thicknesses in excess of about ¼ inch during the solidification result in non-uniform products, the top being waxy and the bottom plaster-like, and hence are to be avoided. The use of film thicknesses of less than $\frac{1}{32}$ inch is not injurious in itself, but it unnecessarily decreases the capacity of the equipment without any compensating benefits.

The relatively high temperatures employed in the process of this invention constitute one of its unique features, since temperatures in this range have hitherto been purposely avoided. Temperatures in the range of 80° to 120° make possible a very rapid reaction, but unless the remaining variables are simultaneously controlled according to the present teachings, the use of high temperatures alone will result in a product having poor nitrogen availability. At temperatures below about 60° C., the reaction proceeds very slowly and the advantages of the invention are not fully realized. Above about 120° C., blistering and splattering of the liquid composition on the moving surface occurs. The insolubility of the product increases as the temperature is raised from 80° to 100° C., but does not increase much as the temperature is raised higher. Hence the preferred operating temperature is within the range of 80° to 100° C.

An acid catalyst is necessary in order to make the reaction go and the higher the acid concentration, the faster the reaction proceeds. At a pH lower than about 2.0, however, the availability of the nitrogen in the product is decreased inordinately. A pH of about 6.0 is the upper limit for reasonably rapid reaction. Acids such as sulfuric, hydrochloric, phosphoric, nitric, formic and the like, and acid salts such as sodium acid pyrophosphate have been employed interchangeably as the catalyst. When employing sulfuric acid, about 0.03% by weight, based on the weight of urea plus formaldehyde in the feed, is needed to give a pH of 6.0, and about 1.0% by weight is needed to give a pH of 2.0. A pH of from 3.0 to 2.5, corresponding to about 0.1% to 0.25% of sulfuric acid, is preferred.

The time required for the reaction may vary considerably depending upon the choice of other conditions. Almost invariably, however, the reaction is much faster according to the present process than it is under any process known heretofore. Increasing the temperature, increasing the acidity, decreasing the water content of the feed, decreasing the mol ratio of urea to formaldehyde, and decreasing the thickness of the layer on the moving surface all have the effect of decreasing the reaction time, and all tend to reduce the availability of the insoluble nitrogen in the product. The reaction should be allowed to continue until solidification occurs and the product can be scraped from the moving surface. If the product is allowed to remain unneutralized for too long on the heated moving surface, its insolubility will increase but its availability will soon drop below the desired level. Reaction times of from 10 to 200 seconds have been employed for the most part, but shorter or longer times may also be employed satisfactorily. Reaction times of from 10 to 60 seconds are preferred from the standpoint of obtaining higher product quality and higher equipment capacity.

Neutralization of the solidified product to a pH of 6.0 or above is a particularly important feature as regards obtaining a stabilized fertilizer having good storage properties. Neutralization may be achieved by spraying or slurrying either the dried ground product or the undried product with a stoichiometric amount of a solution of a strong base such as sodium hydroxide. Alternately, calcium carbonate may be employed in the form of a powder or a slurry, using either a stoichiometric amount or an excess of perhaps 100%. For example, undried flakes as scraped from the drum reactor may be tumbled with calcium carbonate powder followed by drying, or the dried ground product may be mixed with an excess of powdered calcium carbonate followed by water spraying and drying. Excellent results may also be obtained by employing gaseous ammonia or liquid ammoniacal solutions. As stated hereinbefore, the product may be neutralized while still on the drum reactor, for instance, or after removal therefrom. The advantage of neutralization is that it preserves the availability characteristics of the fertilizer.

Any moving surface such as that of a rotating drum, a rotating disk, a continuous belt or the like, may be employed in the process of this invention. The preferred apparatus comprises a hollow drum adapted to have a heat control medium passed through it, as shown in the figures of the drawing. It is also possible to employ two drums mounted side by side with their axes running parallel to each other in a horizontal plane. A small pool of liquid is maintained above the point of contact of the two drums and as the drums rotate in opposite directions upwardly and away from this point, films are formed and carried upwardly with the drums. Either steam or hot water is the most suitable heat control medium, the temperature of the steam, of course, being regulated by means of the amount of pressure or vacuum under which it is employed. The surface itself may comprise any relatively hard material which is unaffected by the reactants and the temperature. Acid-resistant metals such as stainless steel, chromium or nickel-plated metals, acid-resistant hard plastics, hardened rubber-like compositions, etc. are all useful. The particular design features and the dimensions of the drum or other moving surface will be apparent to those skilled in the art.

*Example 1.*—A 36% aqueous solution of substantially methanol-free formaldehyde was treated with an aqueous solution of sodium hydroxide to bring the pH to about 9. About 1.5 mols of crystal urea was added per mol of formaldehyde and the solution gradually heated to 60° C. where it was kept for 20 minutes. The solution was then allowed to cool and the pH checked to insure that it was above 7. This feed solution was continuously mixed with 10% aqueous sulfuric acid in an amount sufficient to bring the pH to 3.0, as measured by diluting 10 cc. of feed with 40 cc. of water. After passing through a short mixing trough, the liquid feed was spread onto a chromium-plated stainless steel drum 14 inches in diameter, 12 inches wide, and generally similar to that shown in Figure 1. The drum surface was kept at about 80° to 90° C. by steam introduced under a slight vacuum, and the drum was rotated at 1 R. P. M. The film thickness on the drum averaged approximately $\frac{1}{16}$ inch. The product was easily flaked from the drum after 85% of the rotation had been completed, which represented a time on the drum of 50 seconds. The product was neutralized by tumbling with from 0.5 to 1.0% by weight of powdered calcium carbonate and a small amount, less than 10% by weight, of water. It was then dried and crushed to give a granular free-flowing fertilizer having a total nitrogen content of 40.5%, an insoluble nitrogen content of 61.5% of the total nitrogen, and an availability index of 60%.

*Example 2.*—About 94 pounds of 36.2% formaldehyde solution (substantially methanol-free) was treated with 113 cc. of 6 N sodium hydroxide solution to bring its pH to 9.3. 102 pounds of crystal urea was added to the formaldehyde in a jacketed glass-lined kettle with agitation and the mixture heated to about 60° C. After being held at 60° C. for about 20 minutes, the solution was cooled to about 25° C. Its pH was 9.9. The above feed was pumped into a mixing trough at a rate of approximately 52 lbs./hour and 9.6 weight per cent sulfuric acid solution added at a rate of 369 gms./hour. The pH of the mixture, after acid addition was 3.0 (mixture diluted 4 to 1 with distilled water for pH measurement). The liquid mixture was fed onto the top of a chromium-plated stainless steel drum 14 inches in diameter, 12 inches wide, and generally similar to that shown in Figure 1. The drum surface was kept at 100° C. by atmospheric steam, and the drum was rotated at 2 R. P. M. The product was easily flaked from the drum after 85% of the rotation had been completed, which represented a time on the drum of about 25 seconds. 102 lbs. of product containing 27.9% water was collected. This product was neutralized, dried and crushed as follows: 85 lbs. of the undried product was tumbled with 386 gm. of powdered calcium carbonate for 1 hour. Then about 7 lbs. of water was sprayed into the mixture while tumbling and tumbling continued for 20 minutes. The fairly free-flowing flakes were then discharged into trays and dried with 180 to 225° F. air for 8 hours. The dried product was then crushed through a 20 mesh screen on an oscillating granulator. The pH of the product before neutralization was 2.8 and after neutralization 7.8. The dried product contained 40% total nitrogen. Its insoluble nitrogen content was 29.0% or 72.5% of the total nitrogen and its availability index was 48%.

The advantage of the present process is that it makes possible the accurate control of the several critical conditions which have been discovered. As a result, urea-formaldehyde fertilizer compositions which are of consistently high quality may be prepared with surprising rapidity on a practical commercial scale.

The products obtained by the process of this invention can be mixed with many other types of fertilizers in order to obtain balanced compositions containing phosphorus, potassium, and the like. They may also be mixed with other nitrogen-containing fertilizer ingredients including urea, ammonium sulfate, ammonium nitrate, ammoniating solutions, etc. A particularly useful effect is observed when the urea-formaldehyde products are mixed with fertilizer constituents containing free urea, such as urea-ammonia liquors, because the free urea exercises a stabilizing action on the urea-formaldehyde which is not observed upon mixing with the nitrate liquors or other comparable products. This stabilizing action is most noticeable at the higher temperatures encountered during curing and pile storage.

Since many changes and modifications of the process of this invention will occur to those skilled in the art, it is not intended that the invention should be limited in any way other than by the following claims.

We claim:

1. A method for preparing a solid urea-formaldehyde fertilizer composition which comprises continuously introducing a liquid aqueous composition containing from 1.3 to 1.6 molecular equivalents of urea per molecular equivalent of formaldehyde onto a moving surface in an amount sufficient to form a thin layer on said surface of from $\frac{1}{32}$ inch to $\frac{1}{4}$ inch in thickness, subjecting the urea-formaldehyde composition to reaction thereon at a temperature of from 60° to 120° C. and at a pH of from 2 to 6 until solidification of the composition occurs, and thereafter continuously removing the solidified product from said surface.

2. A method for preparing a solid urea-formaldehyde fertilizer composition which comprises continuously introducing a liquid aqueous composition containing from 1.3 to 1.6 molecular equivalents of urea per molecular equivalent of formaldehyde onto the outer surface of a slowly-rotating drum in an amount sufficient to form a thin layer thereon of from $\frac{1}{32}$ inch to $\frac{1}{4}$ inch in thickness, subjecting the urea-formaldehyde composition to reaction on the drum at a temperature of from 60° to 120° C. and at a pH of from 2 to 6 until solidification of the composition occurs, and thereafter removing the solidified product before any given portion of the reactants has made a complete rotation on the drum.

3. A method for preparing a solid urea-formaldehyde fertilizer composition which comprises preparing an aqueous urea-formaldehyde solution having a pH of from 9.0 to 9.5, a solids content of from 60% to 85%, and a ratio of from 1.3 to 1.6 molecular equivalents of urea per molecular equivalent of formaldehyde; heating said aqueous solution to a temperature of from 50° to 75° C.; adding an acidic catalyst to this heated solution to produce a pH of from 2 to 6; promptly introducing this acidified solution onto the outer surface of a slowly-rotating drum in an amount sufficient to form a thin layer thereon of from $\frac{1}{32}$ inch to $\frac{1}{4}$ inch in thickness; subjecting the urea-formaldehyde composition to reaction on the drum at a temperature of from 80° to 100° C. and at a pH of from 2 to 6 until solidification of the composition occurs; and thereafter removing the solidified product before any given portion of the reactants has made a complete rotation on the drum.

4. A method for preparing a solid urea-formaldehyde fertilizer composition which comprises preparing a liquid aqueous composition containing from 1.3 to 1.6 molecular equivalents of urea per molecular equivalent of formaldehyde and containing from about 60% to about 85% solids, continuously introducing said aqueous composition onto the outer curved surface of a slowly-rotating drum in an amount sufficient to form a thin layer thereon of from $\frac{1}{32}$ inch to $\frac{1}{4}$ inch in thickness, subjecting the urea-formaldehyde composition to reaction on the drum at a temperature of from 80° to 100° C., at a pH of from 2 to 6, and during a time interval of from 10 to 200 seconds, whereby solidification of the composition occurs, and thereafter removing the solidified product before any given portion of the reactants has made a complete rotation on the drum, the temperature of the reactants on the drum being controlled by means of steam introduced into the inside of the drum.

5. A method for preparing a solid urea-formaldehyde fertilizer composition which comprises preparing a liquid aqueous composition containing from 1.3 to 1.6 molecular equivalents of urea per molecular equivalent of formaldehyde and containing from about 60% to about 85% solids, continuously introducing said aqueous composition onto the outer surface of a slowly-rotating drum in an amount sufficient to form a thin layer thereon of from $\frac{1}{32}$ inch to $\frac{1}{4}$ inch in thickness, subjecting the urea-formaldehyde composition to reaction on the drum at a temperature of from 60° to 120° C. and at a pH of from 2 to 6 until solidification of the composition occurs, treating the solidified composition while on the drum with at least the amount of base required to react stoichiometrically with all of the acid present, maintaining the neutralized composition on the drum at a temperature of from 60° to 120° C. for a short time to effect a partial drying thereof, and thereafter removing the solidified product before any given portion of the reactants has made a complete rotation on the drum.

6. A method for preparing a solid urea-formaldehyde fertilizer composition which comprises continuously introducing a liquid aqueous composition containing from 1.3 to 1.6 molecular equivalents of urea per molecular equivalent of formaldehyde onto a moving surface in an amount sufficient to form a thin layer on said surface of from $\frac{1}{32}$ inch to $\frac{1}{4}$ inch in thickness, subjecting the urea-formaldehyde composition to reaction thereon at a temperature of from 60° to 120° C. and at a pH of from 2 to 6 until solidification of the composition occurs, and thereafter neutralizing the resulting urea-formaldehyde composition.

7. A method for preparing a solid urea-formaldehyde fertilizer composition which comprises preparing a liquid aqueous composition containing from 1.3 to 1.6 molecular equivalents of urea per molecular equivalent of formaldehyde and containing from about 60% to about 85% solids, continuously introducing said aqueous composition onto a moving surface in an amount sufficient to form a thin layer on said surface of from $\frac{1}{32}$ inch to $\frac{1}{4}$ inch in thickness, subjecting the urea-formaldehyde composition to reaction thereon at a temperature of from 60° to 120° C. and at a pH of from 2 to 6 until solidification of the composition occurs, continuously removing the solidified product from said surface and thereafter neutralizing the resulting urea-formaldehyde composition.

8. A method for preparing a solid urea-formaldehyde fertilizer composition which comprises preparing a liquid aqueous composition containing from 1.3 to 1.6 molecular equivalents of urea per molecular equivalent of formaldehyde and containing from about 60% to about 85% solids, continuously introducing said aqueous composition onto a moving surface in an amount sufficient to form a thin layer on said surface of from $\frac{1}{32}$ inch to $\frac{1}{4}$ inch in thickness, subjecting the urea-formaldehyde composition to reaction thereon at a temperature of from 60° to 120° C. and at a pH of from 2 to 6 until solidification of the composition occurs, neutralizing the resulting urea-formaldehyde composition while still on said surface, and thereafter continuously removing the solidified product from said surface.

9. A method for preparing a solid urea-formaldehyde fertilizer composition which comprises continuously introducing a liquid aqueous composition containing from 1.3 to 1.6 molecular equivalents of urea per molecular equivalent of formaldehyde onto a heated surface in an amount sufficient to form a thin layer on said surface of from $\frac{1}{32}$ inch to $\frac{1}{4}$ inch in thickness, subjecting the urea-formaldehyde composition to reaction thereon at a temperature of from 60° to 120° C. and at a pH of from 2 to 6 until solidification of the composition occurs, and thereafter continuously removing the solidified product from said surface.

10. A method for preparing a solid urea-formaldehyde fertilizer composition which comprises preparing a liquid aqueous composition containing from 1.3 to 1.6 molecular equivalents of urea per molecular equivalent of formaldehyde and containing from about 60% to about 85% solids, continuously introducing said aqueous composition onto a heated surface in an amount sufficient to form a thin layer on said surface of from $\frac{1}{32}$ inch to $\frac{1}{4}$ inch in thickness, said composition being introduced by means of an element which is in constant motion relative to said heated surface, subjecting the urea-formaldehyde composition to reaction on said surface at a temperature of from 60° to 120° C. and at a pH of from 2 to 6 until solidification of the composition occurs, and thereafter continuously removing the solidified product from said surface.

11. A method for preparing a solid urea-formaldehyde fertilizer composition which comprises preparing an aqueous urea-formaldehyde solution having a pH of from 9.0 to 9.5, a solids content of 60% to 85%, and a ratio of from 1.3 to 1.6 molecular equivalents of urea per molecular equivalent of formaldehyde; heating said aqueous solution to a temperature of from 50 to 75° C.; cooling the solution to below 40° C.; adding an acidic catalyst to this solution to produce a pH of from 2 to 6; promptly introducing this acidified solution onto the outer surface of a slowly-rotating drum in an amount sufficient to form a thin layer thereon of from $\frac{1}{32}$ inch to $\frac{1}{4}$ inch in thickness; subjecting the urea-formaldehyde composition to reaction on the drum at a temperature of from 80° to 100° C. and at a pH of from 2 to 6 until solidification of the composition occurs; and thereafter removing the solidified product before any given portion of the reactants has made a complete rotation on the drum.

12. A method for preparing a solid urea-formaldehyde fertilizer composition which comprises preparing an aqueous urea-formaldehyde solution having a pH greater than 7.0, a solids content of from about 60% to about 85% and a ratio of from 1.3 to 1.6 molecular equivalents of urea per molecular equivalent of formaldehyde; acidifying; continuously introducing the acidified solution onto a moving surface in an amount sufficient to form a thin layer on said surface of from $\frac{1}{32}$ inch to $\frac{1}{4}$ inch in thickness, subjecting the urea-formaldehyde composition to reaction thereon at a temperature of from 60° to 120° C. and at a pH of from 2 to 6 until solidification of the composition occurs, and thereafter continuously removing the solidified product from said surface.

13. A method for preparing a solid urea-formaldehyde fertilizer composition which comprises the steps of adding urea to a formaldehyde solution having a pH of from 9.0 to 9.5 to produce an aqueous solution having a solids content of from about 60% to about 85%, and a ratio of from 1.3 to 1.5 molecular equivalents of urea per molecular equivalent of formaldehyde; acidifying; continuously introducing the acidified solution onto a moving surface in an amount sufficient to form a thin layer on said surface of from $\frac{1}{32}$ inch to $\frac{1}{4}$ inch in thickness, subjecting the urea-formaldehyde composition to reaction thereon at a temperature of from 60° to 120° C. and at a pH of from 2 to 6 until solidification of the composition occurs, and thereafter continuously removing the solidified product from said surface.

14. A method for preparing a solid urea-formaldehyde fertilizer composition which comprises preparing an aqueous urea-formaldehyde solution having a pH greater than 7.0, a solids content of from about 60% to about 85% and a ratio of from 1.3 to 1.6 molecular equivalents of urea per molecular equivalent of formaldehyde; reacting the urea and formaldehyde on a moving surface in the form of a thin layer of from $\frac{1}{32}$ inch to ¼ inch in thickness at a temperature of from 60° to 120° C. and at a pH of from 2 to 6 until solidification of the composition occurs; and thereafter continuously removing the solidified product from said surface.

15. A method for preparing a solid urea-formaldehyde fertilizer composition which comprises the steps of adding urea to a formaldehyde solution having a pH of from 9.0 to 9.5 to produce an aqueous solution having a solids content of from about 60% to about 85%, and a ratio of from 1.3 to 1.6 molecular equivalents of urea per molecular equivalent of formaldehyde; heating said aqeous solution to a temperature of from 50° to 75° C.; cooling the solution to below 40° C.; maintaining the cooled solution at a pH greater than 7.0; acidifying; continuously introducing the acidified solution onto a moving surface in an amount sufficient to form a thin layer on said surface of from $\frac{1}{32}$ inch to ¼ inch in thickness, subjecting the urea-formaldehyde composition to reaction thereon at a temperature of from 60° to 120° C. and at a pH of from 2 to 6 until solidification of the composition occurs, and thereafter continuously removing the solidified product from said surface.

16. A method for preparing a solid urea-formaldehyde fertilizer composition which comprises preparing a liquid aqueous composition containing from 1.3 to 1.6 molecular equivalents of urea per molecular equivalent of formaldehyde, and containing from about 60% to about 85% solids, continuously introducing said aqueous composition onto a moving surface in an amount sufficient to form a thin layer on said surface of from $\frac{1}{32}$ inch to ¼ inch in thickness, subjecting the urea-formaldehyde composition to reaction thereon at a temperature of from 60° to 120° C. and at a pH of from 2 to 6 until solidification of the composition occurs, and thereafter continuously removing the solidified product from said surface.

17. A method for preparing a solid urea-formaldehyde fertilizer composition which comprises preparing a liquid aqueous composition containing from 1.3 to 1.6 molecular equivalents of urea per molecular equivalent of formaldehyde, and containing from about 60% to about 85% solids, continuously introducing said aqueous composition onto the outer surface of a slowly rotating drum in an amount sufficient to form a thin layer thereon of from $\frac{1}{32}$ inch to ¼ inch in thickness, subjecting the urea-formaldehyde composition to reaction on the drum at a temperature of from 60° to 120° C. and at a pH of from 2 to 6 until solidification of the composition occurs, and thereafter removing the solidified product before any given portion of the reactants has made a complete rotation on the drum.

18. A method for preparing a solid urea-formaldehyde fertilizer composition which comprises preparing a liquid aqueous composition containing from 1.3 to 1.6 molecular equivalents of urea per molecular equivalent of formaldehyde and containing from about 60% to about 85% solids, continuously introducing said aqueous composition onto a moving surface in an amount sufficient to form a thin layer on said surface of from $\frac{1}{32}$ inch to ¼ inch in thickness, subjecting the urea-formaldehyde composition to reaction thereon at a temperature of from 60° to 120° C. and at a pH of from 2 to 6 until solidification of the composition occurs, and thereafter neutralizing the resulting urea-formaldehyde composition.

19. A method for preparing a solid urea-formaldehyde fertilizer composition which comprises preparing a liquid aqueous composition containing from 1.3 to 1.6 molecular equivalents of urea per molecular equivalent of formaldehyde and containing from about 60% to about 85% solids, continuously introducing said aqueous composition onto a heated surface in an amount sufficient to form a thin layer on said surface of from $\frac{1}{32}$ inch to ¼ inch in thickness, subjecting the urea-formaldehyde composition to reaction thereon at a temperature of from 60° to 120° C. and at a pH of from 2 to 6 until solidification of the composition occurs, and thereafter continuously removing the solidified product from said surface.

ROBERT D. KRALOVEC.
ROBERT L. HUFFMAN.

REFERENCES CITED

The following references are of record in the file of this patent:

UNITED STATES PATENTS

| Number | Name | Date |
|---|---|---|
| 1,929,624 | Canon | Oct. 10, 1933 |
| 2,034,599 | Van Marle | Mar. 17, 1936 |
| 2,118,439 | Lawrence et al. | May 24, 1938 |
| 2,345,013 | Soday | Mar. 28, 1944 |
| 2,415,705 | Rohner et al. | Feb. 11, 1947 |
| 2,456,192 | Houlton | Dec. 14, 1948 |

FOREIGN PATENTS

| Number | Country | Date |
|---|---|---|
| 419,422 | Canada | Apr. 4, 1944 |

OTHER REFERENCES

Clark et al., A Slow-Acting Nitrogen Fertilizer, Chemical Trade Journal and Chemical Engineer, August 6, 1948, pages 149–150.